US012592145B2

(12) United States Patent
Escofet Via et al.

(10) Patent No.: US 12,592,145 B2
(45) Date of Patent: Mar. 31, 2026

(54) FIRE DETECTION SYSTEM TESTING

(71) Applicant: Carrier Corporation, Palm Beach Gardens, FL (US)

(72) Inventors: Jordi Escofet Via, Barcelona (ES); Andres Cordoba, Barcelona (ES); Gustavo Taus, Barcelona (ES)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

(21) Appl. No.: 18/346,129

(22) Filed: Jun. 30, 2023

(65) Prior Publication Data

US 2024/0087443 A1 Mar. 14, 2024

(51) Int. Cl.

| | |
|---|---|
| ***G08B 29/04*** | (2006.01) |
| ***G08B 17/10*** | (2006.01) |
| ***G08B 29/10*** | (2006.01) |
| ***G08B 29/20*** | (2006.01) |

(52) U.S. Cl.

CPC ........... *G08B 29/043* (2013.01); *G08B 17/10* (2013.01); *G08B 29/10* (2013.01); *G08B 29/20* (2013.01)

(58) Field of Classification Search

CPC ...... G08B 29/043; G08B 17/10; G08B 29/10; G08B 29/20; G08B 29/145; G08B 29/12

See application file for complete search history.

(56) References Cited

U.S. PATENT DOCUMENTS

| | | | |
|---|---|---|---|
| 6,950,016 | B2 | 9/2005 | Farley |
| 7,047,442 | B2 | 5/2006 | Sutton |
| 7,649,450 | B2 | 1/2010 | Campion, Jr. et al. |
| 7,786,854 | B2 | 8/2010 | Hosey |
| 8,228,182 | B2 | 7/2012 | Orsini et al. |
| 8,508,359 | B2 | 8/2013 | Piccolo, III |

(Continued)

FOREIGN PATENT DOCUMENTS

| | | | |
|---|---|---|---|
| AU | 2018354716 | A1 | 6/2020 |
| EP | 2879105 | A1 | 6/2015 |

(Continued)

OTHER PUBLICATIONS

European Search Report for Application No. 22382624.9, Issued Nov. 30, 2022, 9 Pages.

(Continued)

*Primary Examiner* — Quan Zhen Wang

*Assistant Examiner* — Rajsheed O Black-Childress

(74) *Attorney, Agent, or Firm* — CANTOR COLBURN LLP

(57) ABSTRACT

A detector unit for use in a fire detection system is provided, comprising: a sensor for monitoring an environmental condition; an indicator for generating a visible indication; and a controller in connection with the sensor and the indicator, wherein the controller is configured to communicate with a fire alarm control panel of the fire detection system; wherein the controller is configured to operate the detector unit in a testing mode, the testing mode being for testing a response of the fire detection system to an environmental condition that is indicative of a fire; and wherein the controller is configured to cause the indicator to indicate an outcome of a test carried out on the detector unit when the detector unit is operating in the testing mode.

16 Claims, 3 Drawing Sheets

(56) References Cited

U.S. PATENT DOCUMENTS

| | | | | |
|---|---|---|---|---|
| 8,698,613 | B2 | 4/2014 | Mcevoy | |
| 8,773,254 | B2 | 7/2014 | Piccolo, III | |
| 9,015,020 | B2 | 4/2015 | Lontka | |
| 9,030,314 | B2 | 5/2015 | Piccolo, III et al. | |
| 9,041,527 | B2 | 5/2015 | Smith et al. | |
| 9,076,316 | B2 | 7/2015 | Piccolo, III et al. | |
| 9,076,319 | B2 | 7/2015 | Boisclair et al. | |
| 9,123,218 | B2 | 9/2015 | Tsubokawa et al. | |
| 9,552,720 | B2 | 1/2017 | Moffa | |
| 9,767,679 | B2 * | 9/2017 | Piccolo, III .......... | G08B 29/145 |
| 9,830,806 | B2 | 11/2017 | Cree et al. | |
| 10,163,310 | B2 | 12/2018 | Kulkarni et al. | |
| 10,216,164 | B2 | 2/2019 | Brown et al. | |
| 10,348,575 | B2 | 7/2019 | Sundermeyer et al. | |
| 10,355,951 | B2 | 7/2019 | Janky et al. | |
| 10,360,789 | B2 | 7/2019 | Brown et al. | |
| 10,607,477 | B2 | 3/2020 | Bonfiglio | |
| 10,825,337 | B2 | 11/2020 | Piech et al. | |
| 10,922,954 | B2 | 2/2021 | Becker et al. | |
| 10,937,302 | B2 | 3/2021 | Sahai et al. | |
| 11,062,574 | B2 | 7/2021 | Savage, Jr. et al. | |
| 11,175,793 | B2 | 11/2021 | Fulker et al. | |
| 11,232,703 | B1 | 1/2022 | Wolf et al. | |
| 2004/0168111 | A1 | 8/2004 | Arnold et al. | |
| 2018/0075733 | A1 * | 3/2018 | Brown ................. | G08B 29/145 |
| 2018/0082554 | A1 | 3/2018 | Siminoff et al. | |
| 2018/0114431 | A1 | 4/2018 | Volam et al. | |
| 2019/0235454 | A1 | 8/2019 | Reichl et al. | |
| 2019/0327448 | A1 | 10/2019 | Fu et al. | |
| 2020/0402381 | A1 * | 12/2020 | Nelson ..................... | G08B 7/06 |
| 2021/0350693 | A1 | 11/2021 | Nalukurthy et al. | |

FOREIGN PATENT DOCUMENTS

| | | | |
|---|---|---|---|
| JP | 4651290 | B2 | 12/2010 |
| JP | 2020042862 | A | 3/2020 |
| JP | 2022097743 | A | 6/2022 |
| WO | 2009106887 | A1 | 9/2009 |
| WO | 2019079862 | A1 | 5/2019 |
| WO | 2022073708 | A1 | 4/2022 |

OTHER PUBLICATIONS

European Search Report for Application No. 22382624.9, Issued Oct. 13, 2025, 7 Pages.

* cited by examiner

FIRE DETECTION SYSTEM TESTING

BACKGROUND

The present invention relates to a detector unit and a fire alarm control panel for use in a fire detection system, and a method for testing a fire detection system.

It is often a legal requirement for buildings to contain an appropriate fire detection system that will allow an outbreak of fire to be easily detected, and the occupants of that building to quickly be warned. Such fire detection systems typically comprise a fire alarm control panel, which controls the fire detection system through its communications with a plurality of detector units, alerting devices, and extinguishing devices. When a detector unit detects conditions indicative of a fire, it alerts the fire alarm control panel, and the fire alarm control panel will raise an alarm across at least part of the fire detection system in response.

These fire detection systems are subject to certain regulatory requirements in order to ensure that adequate safety measures are provided to the building. As part of these regulatory requirements, inspections of the fire detection system are generally required on a periodic basis in order to ensure that the system is functioning correctly. These inspections typically include testing the performance of the fire detection system in order to ensure that, in the event of a fire, it is able to raise an adequate alarm. Through this testing, operators can identify and account for any issues in the fire detection system.

The above-mentioned fire detection system testing includes testing each detector unit in the fire detection system to ensure that the detector unit, through its communications with the fire alarm control panel, is capable of correctly raising an alarm in the event of a fire. In order to do this, an operator will often conduct a "walk-through" test, where the operator walks through the fire detection system and tests each detector unit individually by simulating conditions indicative of a fire within the vicinity of the detector unit being tested. The exact test carried out will depend on the type of detector unit being tested (e.g. a smoke detector, a CO detector, a heat detector, or any combination thereof), but generally the test will involve an operator employing equipment that covers the detector unit to form a sealed volume surrounding the detector unit, and using that equipment to simulate conditions indicative of a fire within the sealed volume.

The results of the test are recorded at the fire alarm control panel. In typical fire detection systems, the operator conducting the walk-through test is unable to keep track of these results, as the operator does not have access to the fire alarm control panel as they carry out the test. To address this issue, two operators are often required to conduct the test, with one monitoring the fire alarm control panel and the other conducting the walk-through test. The operator at the fire alarm control panel may then update the other operator regarding the progress of the test through some form of communication means, such as a handheld radio transceiver or a mobile phone. Alternatively, some prior art systems rely on the operator using a mobile device that is able to wirelessly communicate with the fire alarm control panel in order to simulate the interface of the fire alarm control panel, thus allowing the operator to remotely monitor the fire alarm control panel through the mobile device. Both of these solutions are, however, inefficient, time-consuming, and complex. There is therefore a need for an improved fire detection system that will allow a single operator to easily keep track of the progress of a test in real-time.

SUMMARY OF INVENTION

According to a first aspect of the invention a detector unit for use in a fire detection system is provided, the detector unit comprising: a sensor for monitoring an environmental condition; an indicator for generating a visible indication; and a controller in connection with the sensor and the indicator, wherein the controller is configured to communicate with a fire alarm control panel of the fire detection system; wherein the controller is configured to operate the detector unit in a testing mode, the testing mode being for testing a response of the fire detection system to an environmental condition that is indicative of a fire; and wherein the controller is configured to cause the indicator to indicate an outcome of a test carried out on the detector unit when the detector unit is operating in the testing mode.

The detector unit of the present invention utilises its indicator to communicate the outcome of a test in real-time. An operator conducting a test of the fire detection system is therefore able to accurately keep track of the test, and note its outcome, by simply observing the indicators of the detector units within the fire detection system. This allows the operator to immediately see if a detector unit has failed a test, thus allowing the operator to inspect and potentially fix the issue as soon as possible. The detector unit of the present invention provides an improvement over known prior art systems, as the operator conducting the test is kept informed of the test outcome in real-time through the detector unit itself, without needing to either visit or communicate with the fire alarm control panel. The detector unit of the present invention therefore enables the testing process to be more efficient, with a reduced chance of errors being made by the operator due to the operator being able to keep track of the test in real-time.

The testing mode of operation is for testing a response of the fire detection system to an environmental condition indicative of a fire. The response depends on the communications between the detector unit and the fire alarm control panel. Thus, the testing mode of operation is for testing correct operation of each of the sensor of the detector unit, the controller of the detector unit, and the communications between the detector unit and the fire alarm control panel when an environmental condition that is indicative of a fire is detected by the detector unit.

The detector unit and/or the fire alarm control panel are each configured such that detection of an environmental condition that is indicative of a fire by a detector unit that is in in a testing mode will not cause the fire detection system to trigger an alarm response.

The communications between the detector unit and the fire alarm control panel may be master-slave communications. The controller may therefore be configured to communicate with the fire alarm control panel in a master-slave relationship. The controller may be configured to control operations of the detector unit. The controller may be, for example, a central processing unit (CPU).

The sensor may be for monitoring an environmental condition that is indicative of a fire, such as smoke, heat, carbon monoxide, and so on. The sensor may be, for example, an optical smoke sensor. As such, the detector unit may be one or more of a smoke detector, a heat detector, and/or a carbon monoxide detector. In addition, the detector unit may comprise a manual input for allowing a user to manually alert the detector unit to a fire. The manual input may be any suitable manual input, such as a button and/or a lever.

The sensor may be configured to transmit the sensed environmental condition to the controller, for example on a periodic basis such as once per second. The controller may be configured to determine if the sensed environmental condition satisfies a predetermined condition. The predetermined condition may indicate the presence of a fire. The controller may be configured to transmit the sensed environmental condition to the fire alarm control panel when the sensed environmental condition satisfies the predetermined condition. Additionally or alternatively, the controller may be configured to transmit the sensed environmental condition to the fire alarm control panel upon receipt of a request from the fire alarm control panel for the sensed environmental condition. The controller may be configured to receive a response to the transmitted sensed environmental condition from the fire alarm control panel.

In a normal mode of operation, the response from the fire alarm control panel may be an instruction to enter an alarm state when the sensed environmental condition indicates the presence of a fire. The controller may be configured to trigger the alarm state in the detector unit in response to the received instruction. The detector unit may be configured to indicate the alarm state through any suitable means, for example through a siren, a horn, and/or flashing lights. The detector unit may be configured to indicate the alarm state through the indicator. Conversely, in the testing mode of operation, the response from the fire alarm control panel may not contain the instruction to enter the alarm state. As such, the detector unit may not enter the alarm state at any point in the testing mode of operation, thus preventing any false alarms being raised as a consequence of the testing.

The controller may be configured to receive a command from the fire alarm control panel instructing the detector unit to enter the testing mode. The controller may be configured to operate the detector unit in the testing mode based upon receipt of the command to enter the testing mode from the fire alarm control panel.

The indicator may be located on a housing of the detector unit. In particular, the indicator may be located on an external housing of the detector unit, such that the indicator is visible to an operator. The indicator may be any suitable indicator for generating a visible indication. For example, the indicator may comprise one or more LED lights and/or an LCD screen. The outcome of the test may be indicated through a colour of the indicator. Additionally or alternatively, the outcome of the test may be indicated through a flashing light pattern of the indicator. The indicator may comprise a plurality of lights, and the outcome of the test may be indicated through a certain subset of these lights being powered. The outcome of the test may be indicated through text and/or symbols on an LCD screen. The indicator may be configured to indicate the alarm state of the detector unit during the normal mode.

The controller may be configured to cause the indicator to indicate whether or not the detector unit has been tested. During a test, an operator typically tests a given detector unit by simulating conditions indicative of a fire near the detector unit. In this way, the operator can test the response of the detector unit, and the fire detection system as a whole, to such conditions. The controller may therefore be configured determine whether the detector unit has been tested based on the sensed environmental condition. In particular, the controller may be configured to determine that the detector unit has not yet been tested if the sensor has not sensed an environmental condition indicative of a fire since the testing mode was triggered. On the other hand, the controller may be configured to determine that the detector unit has been tested if the sensor has sensed an environmental condition indicative of a fire since the testing mode was triggered.

The controller may be configured to determine the type of test that the detector unit should be subjected to. For example, the type of test may be a smoke test, a carbon monoxide test, and/or a heat test. The controller may be configured to receive a notification from the fire alarm control panel indicating the type of test that the detector unit should be subjected to, and may be configured to determine the type of test based on this notification. Alternatively, the type of test that the detector unit should be subjected to may be pre-stored in the controller, for example at the time of manufacture or installation. The controller may be configured to cause the indicator to indicate the type of test that the detector unit should be subjected to. The controller may cause the indicator to flash in one of a predetermined set of patterns corresponding to the type of test that should be undertaken on the detector unit. In this way, the detector unit can communicate to the operator what test the operator should carry out on that particular detector unit. This may be especially advantageous in fire detection systems where a large number of different types of detector units are present. The controller may cause the indicator to stop indicating the type of test that the detector unit should be subjected to once the controller has determined that the detector unit has been tested.

During the test, there may be a period of time between the detector unit being tested and the outcome of the test being determined. Thus, the controller may be configured to cause the indicator to indicate that the detector unit is "under test" during this period of time.

The controller may be configured to determine the outcome of the test carried out on the detector unit during the testing mode. The controller may be configured to determine the outcome based on a response received from the fire alarm control panel during the testing mode. In particular, the controller may be configured to receive a response from the fire alarm control panel indicating the outcome of the test. The controller may be configured to determine the outcome of the test based on this response. The controller is configured to cause the indicator to indicate the outcome of the test accordingly based on its determination of the outcome.

The controller may be configured to determine the outcome of the test based on a lack of response from the fire alarm control panel. A failed test may occur if, for example, a communications medium between the detector unit and the fire alarm control panel is faulty. Alternatively, a failed test may occur if the fire alarm control panel cannot process the communications received from the detector unit correctly, and thus fails to respond to these communications. In these cases, the detector unit may not receive any communication from the fire alarm control panel after the test has begun. The controller may therefore be configured to determine that the test has failed if it has not received a communication from the fire alarm control panel within a predetermined time from the start of the test. The predetermined time may be any suitable time, such as 5 seconds, 10 seconds, or 30 seconds. The controller may be configured to cause the indicator to indicate a failed test outcome after this predetermined time has passed. The controller may comprise a timer for measuring the predetermined time.

As an example, the controller may cause the indicator to turn red in order to indicate a failed test outcome. Alternatively, the controller may cause the indicator to turn green in order to indicate a successful test outcome. The controller may cause the indicator to turn yellow if the detector unit has not been tested. The controller may cause the indicator to flash green if the detector unit is "under test". In this way, the operator may be able to clearly identify which detector units still require testing, which are operating correctly, and which will need further inspection.

The controller may be configured to determine if the detector unit is next in a testing sequence based on a notification from the fire alarm control panel. The testing sequence may be the sequence in which each detector unit in a fire detection system should be tested. If the controller is notified that the detector unit is next in the testing sequence, the controller may be configured to cause the indicator to indicate that the detector unit is next in the testing sequence. The indicator may be configured to indicate that the detector unit is next in the testing sequence in any suitable way. For example, the indicator may be configured to flash yellow when the detector unit is next in the testing sequence. In this way, an operator may be guided through the test according to the testing sequence, thus accelerating the testing process and ensuring that each detector unit is tested.

The controller may be configured to perform a detector unit self-test for testing the functionality of one or more internal components of the detector unit. The detector unit self-test may include testing whether the sensor, the controller, and/or the indicator is functioning correctly. For example, the detector unit self-test may comprise executing a number of functions carried out by the internal components of the detector unit and monitoring for any errors that arise. If an error arises, the detector unit self-test may be considered to have a negative result. The controller may be configured to notify the fire alarm control panel of any errors that arise during the detector unit self-test.

The controller may be configured to trigger the detector unit self-test periodically, for example once every hour, once every twelve hours, or once per day. The controller may be configured to notify the fire alarm control panel of the outcome of the detector unit self-test. The controller may be configured to only operate the detector unit in the testing mode if the outcome of the detector unit self-test is positive. Otherwise, the controller may be configured to ignore any commands from the fire alarm control panel to enter the testing mode. In this way, it can be ensured that the outcome of the test in the testing mode is not affected by faults that are local to the detector unit. The controller may be configured to cause the indicator to indicate a negative outcome of the detector unit self-test, for example through a red flashing light. This allows the operator to quickly and easily identify any faulty detector units in the fire detection system, and replace and/or fix them as necessary.

The detector unit may comprise one or more alarm indicators for indicating an alarm state of the detector unit or the fire detection system. The one or more alarm indicators may be separate from the indicator that indicates the outcome of the test in the testing mode. The one or more alarm indicators may comprise visual and/or aural indicators, such as sirens, bells, horns, and/or lights. In the normal mode of operation, the controller may be configured to activate the one or more alarm indicators when the sensed environmental condition is indicative of a fire. However, the controller may be configured to disable the one or more alarm indicators during the testing mode. This may prevent a false alarm being raised during a test of the fire detection system.

According to a second aspect of the invention, there is provided a fire alarm control panel for use in a fire detection system. The fire alarm control panel comprises a control unit for controlling operations of the fire detection system, wherein the control unit is configured to communicate with a plurality of detector units of the fire detection system; wherein the control unit is configured to trigger a testing mode in at least one detector unit of the fire detection system, the testing mode being a mode for testing a response of the fire detection system to an environmental condition that is indicative of a fire; and wherein the control unit is configured to process a communication received from a detector unit operating in the testing mode, and communicate an outcome response to the communication to said detector unit.

The control unit of the fire alarm control panel of the second aspect may be configured to communicate with a plurality of detector units according to the first aspect of the invention, which may include any of the optional features detailed above with respect to the first aspect.

The control unit may be configured to communicate with the detector units in a master-slave relationship. The control unit may be configured to periodically transmit a polling signal to each detector unit in the fire detection system. The polling signal may include a command to transmit a sensed environmental condition from the detector unit to the fire alarm control panel. The control unit may be configured to process the sensed environmental conditions received from the detector units. The control unit may be configured to determine if any of the received environmental conditions are indicative of a fire.

The control unit may be configured to determine a response to the received environmental conditions. The response may depend on, for example, the location and/or type of detector unit that has sent the environmental condition. For example, if the received environmental condition is determined to be indicative of a fire, the control unit may be configured to transmit a command to one or more of the detector units to enter an alarm state. Additionally, the control unit may be configured to transmit an alarm notification to emergency services or building personnel, for example through a wireless connection to a user device such as a mobile phone or a computer.

The response may depend on the mode in which the detector unit that has sent the sensed environmental condition is operating. If the detector unit is operating in a normal mode of operation, the control unit may be configured to raise an alarm in response to the sensed environmental condition if the sensed environmental condition is determined to be indicative of a fire. If the detector unit is operating in the testing mode, the control unit may be configured to not raise an alarm in response to the sensed environmental condition, even if it is determined that the sensed environmental condition is indicative of a fire.

The fire alarm control panel may comprise a user interface. The user interface may be any suitable user interface, for example an LCD screen. The user interface may comprise one or more inputs for a user. In this way, a user may be able to enter commands to the fire alarm control panel through the user interface. Additionally or alternatively, the control unit may be configured to receive commands from a user through a communication module of the fire alarm control panel that is wirelessly connected to a user device.

The control unit may be configured to trigger the testing mode in the at least one detector unit in response to a user command. The control unit may be configured to receive the user command through the user interface.

The fire alarm control panel may be configured to receive communications from the detector units that contain the outcome of a detector unit self-test carried out by the detector unit. As explained above in relation to the detector unit of the first aspect, a detector unit self-test may be a test carried out by a detector unit to test the functionality of one or more internal components of the detector unit. The fire alarm control panel may be configured to store the outcome of the detector unit self-test for each detector unit in the fire detection system, for example in a memory of the fire alarm control panel. The control unit may be configured to determine a response to the outcomes of the detector unit self-tests. For example, the control unit may be configured to wirelessly communicate any negative outcomes of the detector unit self-tests to a user device. The control unit may be configured to only trigger the testing mode of operation in detector units that have passed the detector unit self-test, preferably in detector units that have passed the most recent detector unit self-test.

The fire alarm control panel may be configured to store the category of each detector unit in the fire detection system. The categories of the detector units may include smoke, heat, carbon monoxide, and so on. The category of a detector unit may indicate the type of test that the detector unit should be subjected to during the testing mode. For example, the smoke category may indicate that the detector unit should be subjected to a smoke test. The control unit may be configured to notify each detector unit operating in the testing mode of the type of test that the detector unit should be subjected to.

The fire alarm control panel may be configured to store which zone each detector unit in the fire detection system is located in. The zone may represent, for example, one or more floors of a building, or one or more rooms of a building. The control unit may be configured to trigger the testing mode in all detector units within a given zone of the fire detection system. This may allow an operator to focus on a given area within the fire detection system during testing, thereby accelerating the testing process. The control unit may be configured to trigger the testing mode in the detector units in only one zone at a time. Additionally or alternatively, the control unit may be configured to ensure that the detector units in at least one zone are not in the testing mode. This may ensure that at least part of the fire detection system is still operating as normal, and thus is still capable of raising an alarm in the event of a fire. For example, the control unit may be configured to receive a sensed environmental condition that is indicative of a fire from a detector unit operating in the normal mode, and, in response, may be configured to trigger the detector units operating in the testing mode to return to the normal mode, whilst also triggering an alarm state in one or more of the detector units. This may allow the fire detection system to return to fully normal operation when a possible fire is present, thus ensuring adequate protection is provided.

The fire alarm control panel may be configured to store a testing sequence for the detector units of the fire detection system, for example in the memory of the fire alarm control panel. The testing sequence may contain the order in which each zone of the fire detection system should be tested. For example, the testing sequence may indicate that a zone on the bottom floor of a building should be tested first, and a zone on the top floor of the building should be tested last. The control unit may trigger the testing mode in the detector units in each zone based on the testing sequence. This may prevent an operator from having to manually trigger the testing mode in each zone sequentially.

Additionally or alternatively, the testing sequence may contain the order in which each individual detector unit in the fire detection system should be tested. The control unit may be configured to determine which detector unit is next in the testing sequence, and, based on this determination, may be configured to notify each detector unit in the testing mode if it is next in the testing sequence.

The control unit is configured to process communications received from the detector units operating in the testing mode. The communications received in the testing mode may comprise an environmental condition sensed by the detector unit. The control unit may be configured to process a communication received from a detector unit in the testing mode in the same way as it would process a communication received from a detector unit in the normal mode. In particular, the control unit may be configured to determine if a communication from a detector unit in the testing mode contains a sensed environmental condition that is indicative of a fire in the same way as it would do so for a communication from a detector unit in the normal mode.

During a test, an operator simulates conditions indicative of a fire in the vicinity of the detector unit under test. As such, it is expected that the sensed environmental condition received by the fire alarm control panel during the testing mode will be indicative of a fire. Thus, the control unit may be configured to determine a positive outcome of the test if the control unit determines that the environmental condition received during the testing mode is indicative of a fire. Conversely, the control unit may be configured to determine a negative outcome of the test if the control unit determines that the environmental condition received during the testing mode is not indicative of a fire. Additionally or alternatively, the control unit may be configured to determine a negative outcome of the test if the control unit is unable to determine whether or not the environmental condition received during the testing mode is indicative of a fire. The fire alarm control panel may be configured to store the outcome of each test in its memory. The fire alarm control panel may be configured to display the outcome of each test on its user interface, for example in response to a command from a user to display the outcomes.

The control unit is configured to determine the outcome response based on the determined outcome of the test, and is configured to communicate the outcome response to the detector unit that has been tested. In this way, the detector unit is informed of the outcome of the test, and is able to indicate this outcome to an operator as the operator conducts the test. The operator therefore does not have to consult the fire alarm control panel in order to see the outcome and progress of the test.

The control unit may be configured to trigger a detector unit to return to the normal mode in response to a command from the user via the user interface. Additionally or alternatively, the control unit may be configured to trigger a detector unit to return to the normal mode in response to a predetermined amount of time elapsing since the detector unit entered the testing mode. The predetermined amount of time may be any suitable amount of time, such as one hour, two hours, three hours, and so on. The predetermined amount of time may be set by a user. Additionally or alternatively, the control unit may be configured to trigger a detector unit to return to the normal mode in response to the control unit detecting that every detector unit operating in the testing mode has been tested. This may prevent the fire alarm control panel from erroneously keeping detector units in the testing mode once the test has finished.

According to a third aspect of the invention, a fire detection system may be provided. The fire detection system may comprise a fire alarm control panel in communication with a plurality of detector units. The fire detection system may comprise the fire alarm control panel of the second aspect comprising any of the optional features described therewith. The fire detection system may further comprise a plurality of detector units, each being a detector unit according to the first aspect, which each comprise any of the optional features described therewith.

The fire alarm control panel may be connected to the detector units in a loop configuration. That is, the fire detection system may comprise a loop of wire, with each end of the loop connected to the fire alarm control panel. The detector units may be located along the loop. The control unit of the fire alarm control panel may be configured to communicate with the detector units by modulating a voltage in the loop. The detector units may be configured to communicate with the fire alarm control panel by modulating a current in the loop, for example using their controller.

Additionally or alternatively, the fire alarm control panel may be in wireless communication with the detector units. The fire alarm control panel and the detector units may each comprise a wireless transceiver for communicating wirelessly with one another The fire detection system may be for a building. The fire detection system may span across any suitable area of the building, such as a room of a building, a floor of the building, or the entirety of the building.

According to a fourth aspect of the invention, a method of testing a fire detection system is provided. The method comprises: triggering, through a control unit of a fire alarm control panel in the fire detection system, a testing mode in a detector unit in the fire detection system; indicating, through an indicator of the detector unit, that the detector unit has not been tested; sensing, through a sensor of the detector unit, an environmental condition that is indicative of a fire; indicating, through the indicator of the detector unit, that a test has been carried out on the detector unit; notifying, through detector unit, the sensed environmental condition to the fire alarm control panel; indicating, through the indicator of the detector unit, an outcome of the test based on a response to the notification of the sensed environmental condition from the fire alarm control panel.

The method may be for testing a fire detection system that comprises the fire alarm control panel of the second aspect and at least one detector unit of the first aspect. The method may be for testing a fire detection system according to the third aspect.

The method may include notifying, through the fire alarm control panel, the detector unit of the type of test that the detector unit should be subjected to. For example, the method may include notifying the detector unit that it should be subjected to a smoke test, a carbon monoxide test, and/or a heat test. The method may include receiving, at a controller of the detector unit, the type of test that the detector unit should be subjected to. The method may include indicating, through the indicator of the detector unit, the type of test that the detector unit should be subjected to.

The method may include triggering, through the fire alarm control panel, the detector unit to return to a normal mode of operation after a predetermined time. The predetermined time may be an amount of time that has elapsed since the detector unit entered the testing mode. The predetermined time may be any suitable length of time, such as one hour, two hours, three hours, and so on. The method may include using a timer of the fire alarm control panel to measure the predetermined time. This may ensure that the detector unit is not erroneously kept in the testing mode. Additionally or alternatively, the method may include triggering the detector unit to return to the normal mode of operation in response to a command from a user. Additionally or alternatively, the method may include triggering the detector unit to return to the normal mode of operation in response to the fire alarm control panel detecting that each detector unit in the testing mode has been tested.

The method may include using test apparatus to simulate conditions indicative of a fire near the detector unit. The test apparatus may be, for example, a smoke emitter, a heat emitter, and/or a carbon monoxide emitter. The test apparatus may comprise a shell for covering the detector unit. The shell may form a closed volume surrounding the detector unit. The test apparatus may comprise a simulation unit within the shell for simulating conditions indicative of a fire near the detector unit under test. The shell may be configured to contain the simulated conditions within the closed volume. In this way, it may be ensured that only the detector unit under test is able to detect the simulated conditions.

The method may include triggering a testing mode in one or more further detector units in the fire detection system. As such, the method may be carried out sequentially on each detector unit operating in the testing mode.

BRIEF DESCRIPTION OF FIGURES

Certain embodiments of the disclosure will now be described by way of example only and with reference to the accompanying drawings, in which.

DETAILED DESCRIPTION

Figure 1:
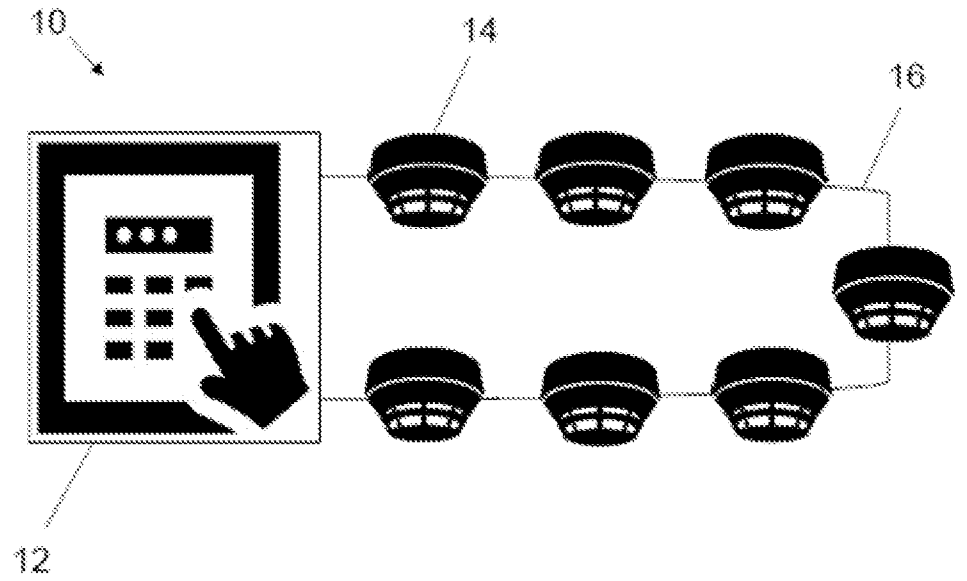
FIG. 1 shows a fire detection system comprising a fire alarm control panel and a plurality of detector units.

FIG. 1 shows a fire detection system 10 comprising a fire alarm control panel 12 and a plurality of detector units 14.

The fire alarm control panel 12 is the controlling component of the fire detection system 10. The fire alarm control panel 12 is configured to receive information from the detector units 14 regarding environmental conditions indicating possible fires, and to monitor the operational integrity of the detector units 14.

The detector units 14 are arranged along a loop 16, which has either end connected to the fire alarm control panel 12. The fire alarm control panel 12 is able to communicate with the detector units 14 through this loop 16, i.e. by modulating the voltage in the loop 16. Similarly, the detector units 14 are able to communicate with the fire alarm control panel 12 through the loop 16, i.e. by modulating the current in the loop 16. The fire alarm control panel 12 communicates with the detector units 14 in a master-slave relationship. The fire alarm control panel 12 is configured to periodically transmit a request for information to each detector unit 14 in the loop 16, and each detector unit 14 is configured to respond with the requested information. In this way, the fire alarm control panel 12 is able to continuously monitor the entire fire detection system 10 and determine appropriate action.

The detector units 14 detect an environmental condition that can indicate the presence of a fire, such as smoke, carbon monoxide, or heat. The fire alarm control panel 12 periodically requests the detected environmental condition from each detector unit 14 in the loop 16. If the fire alarm control panel 12 determines that a received environmental condition meets a predetermined condition, which is indicative of the presence of a fire, the fire alarm control panel 12 will raise an alarm in one or more of the detector units 14 or in a separate alarm unit (not shown).

In addition, the detector unit 14 will automatically notify the fire alarm control panel 12 of a detected environmental condition if the detector unit 14 determines that the environmental condition is indicative of a fire. The fire alarm control panel 12 will then analyse the received environmental condition. If the fire alarm control panel 12 also determines that the environmental condition is indicative of a fire, the fire alarm control panel 12 will respond by raising an alarm at least in the detector unit 14 that sent the notification.

Typically, the detector unit 14 will undertake basic processing in order to determine if a sensed environmental condition is indicative of a fire (e.g., by comparing the detected condition with a predetermined threshold value), whilst the fire alarm control panel 12 will undertake more complex processing that involves a number of factors, such as the conditions detected by surrounding detector units 14, the type of detector unit 14 that has detected the condition indicative of a fire, and the historical data from the detector units 14.

Figure 2:
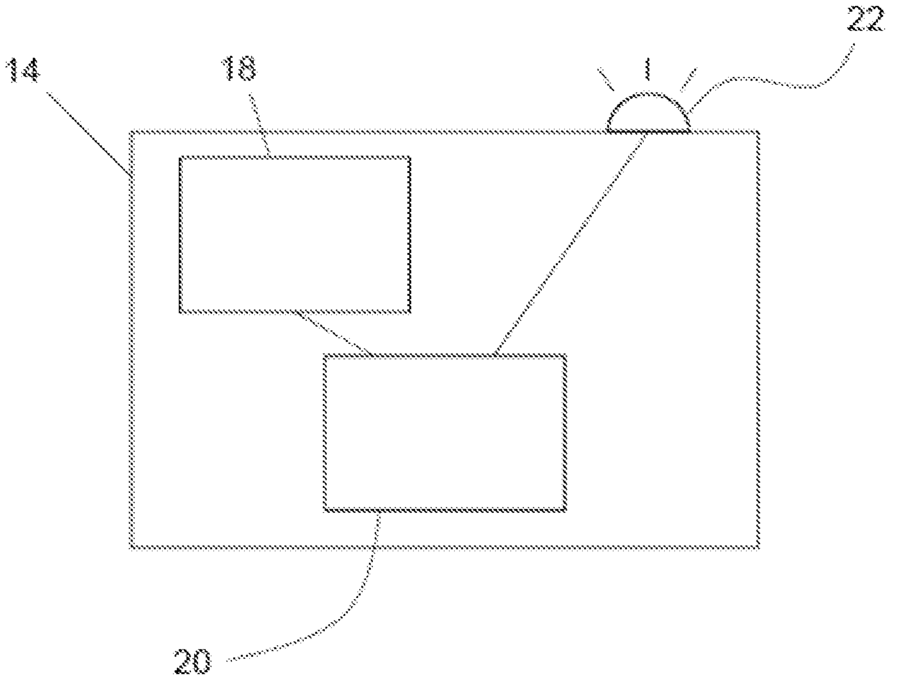
FIG. 2 shows a schematic drawing of a detector unit and its components.

FIG. 2 shows a schematic drawing of a detector unit 14. The detector unit 14 comprises a sensor 18, a controller 20, and an indicator 22. The controller 20 is in communication with the fire alarm control panel 12 via the loop 16, as well as being internally connected to the sensor 18 and the indicator 22. The sensor 18 is configured to detect one or more environmental conditions that can indicate the presence of a fire, such as smoke, heat, or carbon monoxide. The sensor 18 is configured to communicate the detected environmental condition to the controller 20 on a periodic basis. The controller 20 is configured to process the detected environmental condition in order to determine whether it meets a predetermined condition and is indicative of a fire. When the controller 20 determines that the sensed environmental condition is indicative of a fire, it transmits the detected environmental condition to the fire alarm control panel 12 via loop 16. In response, the detector unit 14 will typically receive a communication from the fire alarm control panel 12 instructing it to enter an alarm state. The controller 20 is configured to trigger the alarm state in the detector unit 14 in response to the instruction from the fire alarm control panel 12. In the alarm state, the detector unit 14 will indicate the alarm to users. The detector unit 14 will indicate the alarm state through indicating means (not shown in FIG. 2), such as audible or visual indicating means.

As shown in FIG. 2, the indicator 22 is arranged on an outer surface of the detector unit 14, thus allowing the indicator 22 to be visible to occupants of the building in which the fire detection system 10 is placed. The indicator 22 in the example of FIG. 2 is an LED light. Though not visible from the Figures, the indicator 22 is capable of lighting up in a number of different colours and flashing patterns.

The detector unit 14 can operate in two modes: a normal mode, and a testing mode. In the normal mode, the fire detection system 10 may enter an alarm state if that detector unit 14 detects environmental conditions indicative of a fire. In contrast, in the testing mode, the fire detection system 10 will not enter an alarm state when conditions indicative of a fire are detected by that detector unit 14.

The testing mode of operation is a mode in which the response of the fire detection system to conditions indicative of a fire is tested. In particular, the testing mode is a mode for testing the response of both the fire alarm control panel 12 and the detector unit 14 when conditions indicative of a fire are detected. During the testing mode, the detector unit 14 will be subjected to a test by an operator. As part of this test, conditions indicative of a fire are simulated within the vicinity of the detector unit 14, such that the response of the detector unit 14 to such conditions can tested.

The controller 20 is configured to operate the detector unit 14 in either the normal mode or the testing mode. The controller 20 operates the detector in the normal mode as a default, and triggers the testing mode when instructed to do so by the fire alarm control panel 12.

In the testing mode, the controller 20 is configured to cause the indicator 22 to operate in certain colours and flashing patterns in order to communicate information to an operator. In particular, the indicator 22 communicates the status of the detector unit 14 within the testing mode to an operator. Once the detector unit 14 has entered the testing mode, the controller 20 determines its status within the testing mode. This status includes whether or not the detector unit 14 has been tested yet, and, if so, what the outcome of that test was. The controller 20 then determines what indication the indicator 22 should provide based on the determined status, and instructs the indicator 22 to provide the determined indication.

As mentioned previously, the controller 20 is configured to receive an instruction from the fire alarm control panel 12 to enter the testing mode. Upon receipt of this instruction, the controller 20 is firstly configured to cause the indicator 22 to indicate that the detector unit 14 is in the testing mode. The indicator 22 indicates this by lighting up, allowing an operator to be able to see that the detector unit 14 is in the testing mode rather than the normal mode. This prevents an operator from accidentally triggering an alarm in the fire detection system 10 by performing a test on a detector unit 14 that is not in the testing mode.

As mentioned above, the indicator 22 also indicates the status of detector unit 14 during the testing mode. As part of this status indication, the indicator 22 indicates whether or not the detector unit 14 has been tested since it has entered the testing mode. Though not visible from the Figures, the indicator 22 in the example of FIG. 2 indicates that the detector has not yet been tested by turning yellow. Meanwhile, when the detector unit 14 has been tested, the indicator 22 will switch to a colour different from yellow. In this way, an operator carrying out the test can keep track of which detector units 14 have been tested, and which are still waiting to be tested.

Upon entering the testing mode, the controller 20 will initially determine that the detector unit 14 has not yet been tested, and shall cause the indicator 22 to indicate this (i.e. by turning yellow). The controller 14 will cause the indicator 22 to remain in this state until it has determined that a test has been undertaken on the detector unit 22. As the test involves simulating conditions indicative of a fire within the vicinity of the detector unit 14, the controller 20 is able to determine that the detector unit 14 has been tested if it receives a sensed environmental condition from the sensor 18 that is indicative of a fire. Upon determining that the detector unit 14 has been tested, the controller 20 will cause the indicator to switch indications, such that it no longer indicates that the detector unit 14 is waiting to be tested. In addition, the controller 14 will transmit the sensed environmental condition that is indicative of a fire to the fire alarm control panel 12, just as it would do in the normal mode.

Once a test has been carried out on the detector unit 14, the indicator 22 will indicate the outcome of that test. The outcome of the test may be negative or positive, and the indicator 22 will indicate as such. Though not visible from FIG. 2, the indicator 22 indicates a negative outcome by turning red, and the indicator 22 indicates a positive outcome by turning green. In the time period between the test on the detector unit 14 taking place and the outcome of the test being determined, the indicator 22 will flash green to indicate that the detector unit 14 is "under test", i.e. the detector unit 14 has successfully registered that a test has been administered, but has not yet determined an outcome.

The fire alarm control panel 12 is configured to determine the outcome of the test, and the controller 20 is configured to receive the outcome of the test from the fire alarm control panel 12. The controller 20 therefore determines the outcome of the test based on the received outcome from the fire alarm control panel 12. The controller 20 then causes the indicator 22 to indicate the outcome accordingly. The controller 20 will cause the indicator 20 to indicate that the detector unit 14 is "under test" when it has transmitted the sensed environmental condition indicative of a fire to the fire alarm control panel 12, but has not yet received the outcome of the test from the fire alarm control panel 12.

In some cases, the fire alarm control panel 12 may be unable to transmit the outcome of the test to the detector unit 14. For example, there may be a communications issue or an internal issue of the fire alarm control panel 12 or the detector unit 14 that prevents the detector unit 14 from receiving the outcome from the fire alarm control panel 12. In this case, the outcome of the test is clearly negative, but the controller 14 will not receive this outcome from the fire alarm control panel. To resolve this, the controller 14 is configured to automatically determine that the outcome of the test is negative if it has not received the outcome from the fire alarm control panel 12 within a predetermined amount of time from sending the sensed environmental condition to the fire alarm control panel 12. For example, the controller 20 may cause the indicator to indicate a negative outcome if the controller 20 has not received the outcome from the fire alarm control panel 12 within 30 seconds from sending the sensed environmental condition to the fire alarm control panel 12.

Thus, in accordance with the above, an operator carrying out a test on the detector unit 14 is able to see the results of that test in real-time by simply looking at the indicator 22 of the detector unit. This is advantageous as it allows an operator to immediately identify if a detector unit 14 has failed the test, thus allowing the operator inspect that detector unit 14 and potentially carry out any necessary maintenance at the earliest opportunity. Furthermore, it is generally advantageous for an operator to be able to easily track the overall progress of a test in real-time, as this reduces the chance of the operator making any errors during the test. In comparison, prior art systems generally require the operator to return to the fire alarm control panel 12, or to communicate with a second operator stationed at the fire alarm control panel 12, in order to see the progress of the test and see to any issues that have arisen during the test.

In addition to the above, the controller 20 can determine the type of test that should be conducted on the detector unit 14. The fire alarm control panel 12 is configured to communicate the type of test to the controller 20, and the controller 20 is configured to determine the type of test based on this communication from the fire alarm control panel 12. The controller 20 is then configured to cause the indicator to indicate the type of test that should be carried out on the detector unit 14. Though not shown in FIG. 2, the indicator 22 may indicate the type of test through a particular flashing pattern. The controller 20 causes the indicator to stop indicating the type of test needed once the controller 20 has determined that a test has been carried out on the detector unit 14. Thus, the operator can also keep track of what test they should carry out on each detector unit 14 in the fire detection system 10, which is especially advantageous for systems in which there are large numbers of different types of detector units 14, which all require different tests.

Although shown as a single LED light in FIG. 2, the indicator 22 may take any suitable form. Alternative forms of the indicator 22 are shown in FIGS. 3 and 4.

Figure 3:
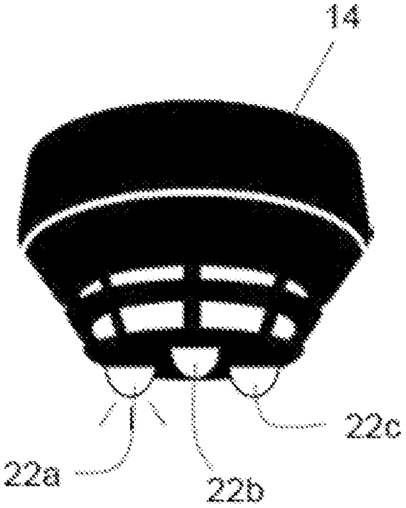
FIG. 3 shows an exemplary detector unit with indicators.

In FIG. 3, the indicator 22 comprises three LED lights 22*a-c*. The controller 20 can cause different ones of the lights 22*a-c* to light up depending on the status of the detector unit 14 in the testing mode. For example, the controller 20 may cause light 22*a* to turn on when the detector unit 14 is waiting to be tested, may cause light 22*b* to turn on when the detector unit 14 has been tested with a positive outcome, and may cause light 22*c* to turn on when the detector unit 14 has been tested with a negative outcome. The controller 20 may cause light 22*a* to flash when the detector unit 14 is "under test", and may create a particular flashing pattern across all three lights 22*a-c* to indicate the type of test that the detector unit 14 should go under.

Figure 4:
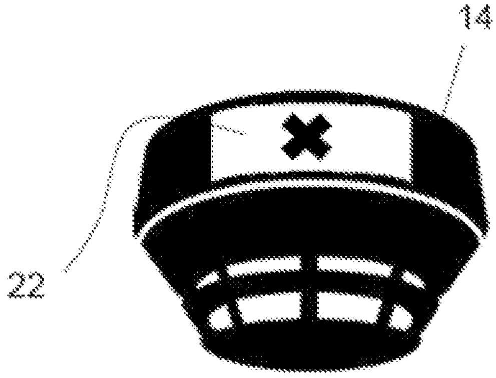
FIG. 4 shows an alternative exemplary detector unit with an indicator.

In FIG. 4, the indicator 22 comprises an LCD screen, with a symbol on the screen to indicate the status of the detector unit 14 in the testing mode. The LCD screen can show any suitable symbol or text for indicating a particular status of the detector unit 14 in the testing mode. The LCD screen can also show any suitable symbol or text for indicating the kind of test that should be carried out on the detector unit 14. In FIG. 4, the LCD screen shows a cross, which indicates a negative outcome of the test. However, the LCD screen may alternatively show, for example, a tick to indicate a positive outcome of the test.

Figure 5:
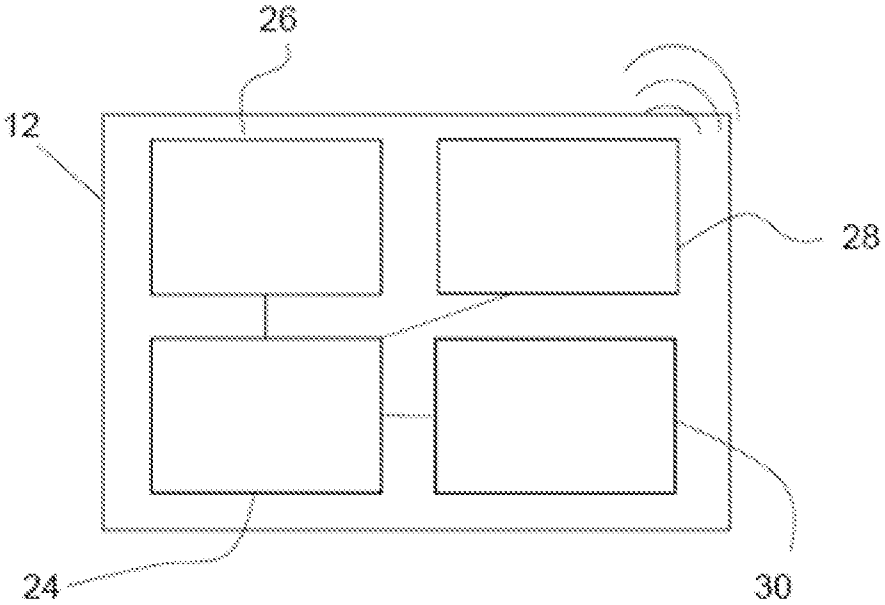
FIG. 5 shows a schematic drawing of a fire alarm control panel and its components.

FIG. 5 shows a schematic drawing of the fire alarm control panel 12. The fire alarm control panel 12 comprises a control unit 24, a user interface 26, a wireless transceiver 28, and a memory 30. The control unit 24 is in communication with the detector units 14 via the loop 16, as well as being internally connected to each of the user interface 26, the wireless transceiver 28, and the memory 30.

The control unit 24 is configured to send out polling signals to the detector units 14 in the fire detection system 10, and to receive responses to those polling signals. The responses generally contain the latest environmental condition detected by the detector units 14. The control unit 24 is configured to process the received environmental conditions and determine a response. For example, if one or more of the received environmental conditions are determined to be indicative of a fire, the control unit 24 will typically transmit instructions to one or more of the detector units 14 to enter an alarm state. Simultaneously, the control unit 24 can transmit an alarm notification to the wireless transceiver 28, which will then transmit the alarm notification to an external device, such as a mobile phone or computer of building occupants or emergency services. The control unit 24 will also store the received environmental conditions in the memory 30.

The user interface 26 allows an operator both to access information from the fire alarm control panel 12 and to input commands to the fire alarm control panel 12. Thus, an operator can view, for example, the environmental conditions measured by the detector units 14 via the fire alarm control panel 12. In addition, an operator can input a command, via the user interface 26, to the fire alarm control panel 12 instructing the fire alarm control panel 12 to trigger the testing mode in one or more of the detector units 14. The user interface 26 communicates this command to the control unit 24, and the control unit 24 transmits commands to the selected detector units 14 instructing those detector units 14 to enter the testing mode. In addition, the control unit 24 keeps track of which detector units 14 are currently operating in the testing mode, and which are not.

When the control unit 24 receives a communication from a detector unit 14 containing a sensed environmental condition, the control unit 24 is configured to analyse that environmental condition. As part of this analysis, the control unit 24 may, for example, compare the environmental condition with historical data, a threshold value, the environmental conditions detected by surrounding detector units 14, and/or data from other devices in the building. The control unit 24 may determine, based on the analysis of the received environmental condition, that the environmental condition is indicative of a fire. The control unit 24 will then determine an appropriate response to the received environmental condition.

In order to determine this response, the control unit 24 will determine whether the received environmental condition has originated from a detector unit 14 operating in the normal mode or the testing mode. If the detector unit 14 is one that is operating in the normal mode, then the control unit 24 will determine an alarm response based on the received environmental condition, i.e. the control unit 24 will determine whether or not an alarm should be raised in one or more detector units 14 within the fire detection system 10 based on the received environmental condition. The control unit 24 will then transmit commands to selected detector units 14 or alarm units (not shown) accordingly, instructing them to enter an alarm state. In this way, the fire alarm control panel 12 can alert occupants of a building to the possible presence of a fire.

If the detector unit 14 is one that is operating in the testing mode, the response from the control unit 24 will differ to the response it would determine if the detector unit 12 were operating in the normal mode. In particular, for detector units 14 operating in the testing mode, the control unit 24 will determine an outcome response instead of an alarm response. In this case, the outcome response will reflect the outcome of the test carried out on the detector unit. A positive outcome response will be determined if the control unit 24 is able to successfully analyse the received environmental condition, and determine that it is indicative of a fire. In contrast, a negative outcome response will be determined if either the control unit 24 is unable to properly analyse the received environmental condition, or if the control unit 24 determines that the received environmental condition is not indicative of a fire. Once the control unit 24 has determined the outcome response, the control unit 24 is configured to transmit the outcome response to the detector unit 14 from which the environmental condition has originated. In this way, the fire alarm control panel 14 can communicate the outcome of a test to a detector unit 14, and the detector unit 14 can subsequently indicate that outcome as described above with reference to FIGS. 2 to 4. This differs to known prior art fire detection systems, where the detector units 14 are not informed of the test outcome, and operators must consult the fire alarm control panel in order to view the test outcomes.

Figure 6:
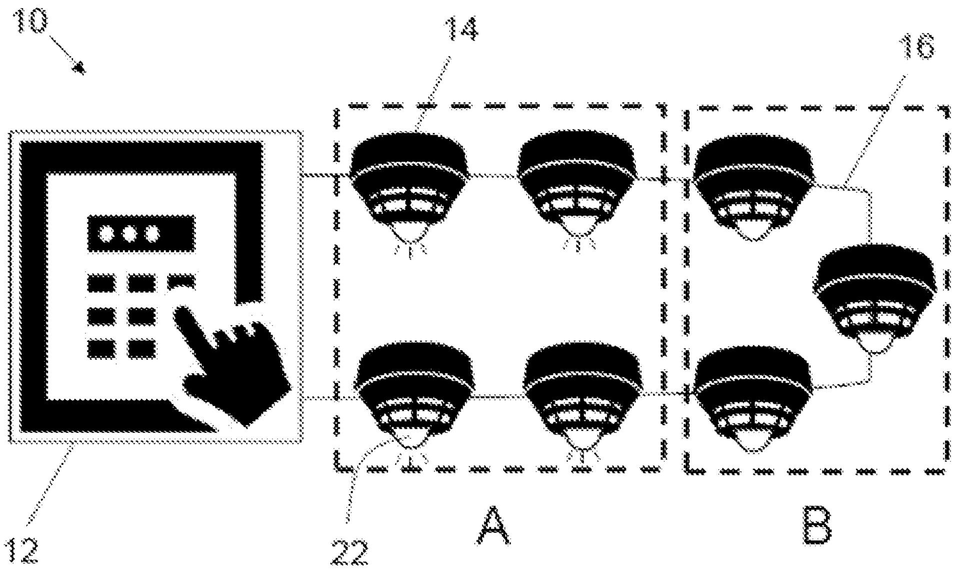
FIG. 6 shows a fire detection system split into zones.

FIG. 6 shows a diagram of the fire detection system 10, wherein different zones of the fire detection system 10 are shown. Two zones, zone A and zone B, are shown in FIG. 6. Zone A can be considered to represent a first floor of the building in which the fire detection system 10 is located, whilst zone B can be considered to represent a second floor of the building. As such, zone A comprises all of the detector units 14 located on the first floor, whilst zone B comprises all of the detector units 14 located on the second floor. The fire alarm control panel 12 stores, in its memory 30, which detector units 14 are located in which zone. The control unit 24 of the fire alarm control panel 12 will determine responses to communications from the detector units 14 based on their zone. For example, the control unit 24 may raise an alarm in only zone A if the received environmental condition indicative of a fire has originated from a detector unit 14 in that zone.

Generally, it is advisable to retain at least some of the detector units 14 operating in the normal mode at all times in order to minimise how much of the fire detection system 10 is disabled at any one time. As such, it is typical for a test to be carried out on selected groups of detector units 14 at a time. Meanwhile, the remaining detector units 14 continue to operate as normal. If the fire alarm control panel 12 receives an environmental condition indicative of a fire from a detector unit 14 operating in the normal mode, it will raise an alarm in the appropriate detector units 14. In addition, the control unit 24 will trigger the detector units 14 operating in the testing mode to return to the normal mode. In this way, it can be ensured that, in a possible fire situation, all detector units 14 are returned to normal functionality as soon as possible, allowing the fire alarm control panel 12 to be able to gather all the information needed to raise an appropriate alarm.

The control unit 24 is configured to trigger the testing mode in all of the detector units 24 in a given zone, whilst leaving the detector units 14 in the other zones operating in the normal mode. In the example shown in FIG. 6, the control unit 24 has triggered the testing mode in all the detector units 14 in zone A, as shown by the indicators 22 of the detector units 14 in this zone being turned on. The detector units 14 in zone B have been left in the normal mode, as shown by their indicators 22 being turned off. Thus, an operator walking past the various detector units 14 of the fire detection system 10 is able to see which detector units 14 they should test, and which they should not test.

The memory 30 of the fire alarm control panel 12 stores a testing sequence for the detector units 14 operating in the testing mode. Based on this testing sequence, the control unit 24 will trigger the testing mode in the detector units 14 in a predetermined order. For example, the control unit 24 will trigger all detector units 14 in zone A to enter the testing mode initially. Once the control unit 24 has determined that all detector units 14 in zone A have been tested, the control unit 24 will consult the testing sequence to determine which zone should enter the testing sequence next (e.g., zone B), and will consequently trigger the testing mode in the all of the detector units 14 in that zone. The operator is therefore guided between zones based on this testing sequence, and the indications provided by the detector units 14. Furthermore, this prevents the operator from having to return to the fire alarm control panel 12 to input a command for a particular zone to enter the testing mode each time they finish a test in another zone.

The testing sequence may further dictate in what order each individual detector unit 14 should be tested. In this case, the control unit 24 will, based on the testing sequence, communicate to each detector unit 14 operating in the testing mode if it is next in that sequence. In response, the controller 20 of the detector unit 14 will cause the indicator 22 to indicate if it is next in the testing sequence. Though not visible from the Figures, the indicator 22 will flash yellow to indicate that it is next in the testing sequence. Thus, an operator can be guided from one detector unit 14 to another during the test operation.

In some cases, not every detector unit 14 within a zone will be instructed to enter the testing mode.

Each detector unit 14 is configured to perform a detector unit self-test on a periodic basis. In this detector unit self-test, the detector unit 14 will test certain of its internal functions and monitor for any errors. If no errors are detected, the detector unit self-test is considered to have a positive outcome. If one or more errors are detected, the detector unit self-test is considered to have a negative outcome. Upon completion of the detector unit self-test, the detector unit 14 is configured to transmit the outcome of the detector unit self-test to the fire alarm control panel 12. The fire alarm control panel 12 is configured to store each outcome of the detector unit self-test in its memory 30, such that an operator can access these outcomes via the user interface 26.

When triggering the testing mode in selected detector units 14, the control unit 24 is configured to check the latest detector unit self-test outcome for each detector unit 14. If the latest outcome of the detector unit self-test for a detector unit 14 is negative, the control unit 24 is configured to not instruct that detector unit 14 to enter the testing mode. This prevents an operator from testing a detector unit 14 that is already known to be faulty, as well as preventing internal issues within the detector unit 14 from impacting the testing carried out in the testing mode.

The control unit 24 is configured to trigger each detector unit 14 in the testing mode to return to the normal mode when it has detected that each detector unit 14 in the testing mode has been tested. The control unit 24 detects that each detector unit 14 in the testing mode has been tested once it has received a sensed environmental condition from each detector unit 14 in the testing mode. Additionally, an operator can manually trigger an end to the testing mode by inputting a command to do so at the user interface 26 of the fire alarm control panel 12. In order to ensure that detector units 14 are not kept in the testing mode erroneously, the control unit 24 is configured to end the testing mode in a detector unit 14 when a predetermined amount of time has elapsed since the testing mode was triggered. This is advantageous in cases where an operator has forgotten to manually end the testing mode at the fire alarm control panel 12, or has had to abandon the test partway through, thus leaving some detector units 14 untested. This is also advantageous in cases where a detector unit 14 has failed a test due to the fire alarm control panel 12 not receiving a sensed environmental condition from that detector unit 14, e.g. due to communication errors. In this case, the fire alarm control panel 12 will assume that the detector unit 14 has not been tested, and will not end the testing mode accordingly. By automatically ending the testing mode after a predetermined amount of time, this issue can be overcome.

Thus, a fire detection system 10 is provided that enables an operator to keep track of the progress of a test carried out on that system 10 in real-time as the operator conducts the test. As such, an operator can ensure that the test is completed in its entirety before returning to the fire alarm control panel, and can also take real-time action in order to fix or examine issues that are identified during the test. This is in contrast to prior art systems, where an operator would either have to liaise with another operator stationed at the fire alarm control panel, or would have to physically be present at the fire alarm control panel themselves, in order to know the outcome and progress of the test.

The invention claimed is:

1. A detector unit for use in a fire detection system, comprising:

a sensor for monitoring an environmental condition;

an indicator for generating a visible indication; and a controller in connection with the sensor and the indicator, wherein the controller is configured to communicate with a fire alarm control panel of the fire detection system;

wherein the controller is configured to operate the detector unit in a testing mode, the testing mode being for testing a response of the fire detection system to an environmental condition that is indicative of a fire; and wherein the controller is configured to cause the indicator to indicate an outcome of a test carried out on the detector unit when the detector unit is operating in the testing mode;

wherein the controller is configured to determine that the test has failed if the controller has not received a communication from the fire alarm control panel within a predetermined time from the start of the test;

wherein the controller is configured to determine if the detector unit is next in a testing sequence based on a notification from the fire alarm control panel and cause the indicator to indicate that the detector unit is next in the testing sequence if the controller is notified that the detector unit is next in the testing sequence by the fire alarm control panel.

2. The detector unit as claimed in claim 1, wherein the detector unit is configured to enter the testing mode in response to receipt of a command from the fire alarm control panel by the controller.

3. The detector unit as claimed in claim 1, wherein the controller is further configured to cause the indicator to indicate whether the detector unit has been tested during the testing mode.

4. The detector unit as claimed in claim 1, wherein the indicator comprises one or more LEDs and/or an LCD screen.

5. The detector unit as claimed in claim 1, wherein the outcome of the test is indicated by a colour of the indicator and/or a flashing light pattern of the indicator.

6. The detector unit as claimed in claim 1, wherein the controller is configured to cause the indicator to indicate what kind of test the detector unit should be subjected to.

7. The detector unit as claimed in claim 1, wherein, in the testing mode, the controller is configured to transmit a notification to the fire alarm control panel when an environmental condition that is indicative of a fire is detected by the sensor, and to determine the outcome of the test based on a response to the notification from the fire alarm control panel.

8. A fire detection system comprising:

a plurality of detector units, each detector unit including:

a sensor for monitoring an environmental condition;

an indicator for generating a visible indication; and a controller in connection with the sensor and the indicator, wherein the controller is configured to communicate with a fire alarm control panel of the fire detection system;

wherein the controller is configured to operate the detector unit in a testing mode, the testing mode being for testing a response of the fire detection system to an environmental condition that is indicative of a fire; and wherein the controller is configured to cause the indicator to indicate an outcome of a test carried out on the detector unit when the detector unit is operating in the testing mode;

wherein the controller is configured to determine that the test has failed if the controller has not received a communication from the fire alarm control panel within a predetermined time from the start of the test;

wherein the controller is configured to determine if the detector unit is next in a testing sequence based on a notification from the fire alarm control panel and cause the indicator to indicate that the detector unit is next in the testing sequence if the controller is notified that the detector unit is next in the testing sequence by the fire alarm control panel;

an alarm control panel for use in the fire detection system, comprising:

a control unit for controlling operations of the fire detection system, wherein the control unit is configured to communicate with the plurality of detector units of the fire detections system;

wherein the control unit is configured to trigger a testing mode in at least one detector unit of the plurality of detector units of the fire detection system; and wherein the control unit is configured to process a communication received from a detector unit operating in the testing mode, and communicate an outcome response to the communication to said detector unit.

9. The fire alarm control panel as claimed in claim 8, wherein the control unit is configured to trigger the testing mode only in detector units that have passed a detector unit self-test, the detector unit self-test being a test carried out by the detector unit to test the functionality of one or more internal components of the detector unit.

10. The fire alarm control panel as claimed in claim 9, wherein the control unit is configured to notify each detector unit in the testing mode of the type of test that the detector unit should be subjected to.

11. The fire alarm control panel as claimed in claim 8, wherein the control unit is configured to trigger the testing mode of operation in all detector units within a given zone of the fire detection system.

12. A method of testing a fire detection system, comprising:

triggering, through a control unit of a fire alarm control panel in the fire detection system, a testing mode in a detector unit in the fire detection system;

indicating, through an indicator of the detector unit, that the detector unit has not been tested;

sensing, through a sensor of the detector unit, an environmental condition that is indicative of a fire;

indicating, through the indicator of the detector unit, that a test has been carried out on the detector unit;

notifying, through detector unit, the sensed environmental condition to the fire alarm control panel;

indicating, through the indicator of the detector unit, an outcome of the test based on a response to the notification of the sensed environmental condition from the fire alarm control panel;

wherein the outcome of the test is determined as failed if the detector unit has not received a communication from the fire alarm control panel within a predetermined time from the start of the test;

wherein the method further comprises determining if the detector unit is next in a testing sequence based on a notification from the fire alarm control panel and causing the indicator to indicate that the detector unit is next in the testing sequence if the detector unit is notified of being next in the testing sequence by the fire alarm control panel.

13. The method as claimed in claim 12, comprising:

notifying, through the fire alarm control panel, the detector unit of the type of test that the detector unit should be subjected to.

14. The method as claimed in claim 13, comprising:

indicating, through the indicator of the detector unit, the type of test that the detector unit should be subjected to.

15. The method as claimed in claim 12, comprising:

triggering, through the fire alarm control panel, the detector unit to return to a normal mode of operation after a predetermined time.

16. The detector unit as claimed in claim 1, wherein the controller is configured to cause the indicator to indicate that the detector unit is under test during the period of time between the detector unit being tested and the outcome of the test being determined.

* * * * *